United States Patent
Ito et al.

(10) Patent No.: US 11,634,121 B2
(45) Date of Patent: Apr. 25, 2023

(54) DRIVING ASSISTANCE APPARATUS AND DRIVING ASSISTANCE METHOD FOR VEHICLE

(71) Applicants: DENSO CORPORATION, Kariya (JP); TOYOTA JIDOSHA KABUSHIKI KAISHA, Toyota (JP)

(72) Inventors: Yosuke Ito, Kariya (JP); Masayasu Tanase, Toyota (JP); Toshinori Okita, Gotenba (JP)

(73) Assignees: DENSO CORPORATION, Kariya (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 361 days.

(21) Appl. No.: 16/575,692

(22) Filed: Sep. 19, 2019

(65) Prior Publication Data
US 2020/0010079 A1 Jan. 9, 2020

Related U.S. Application Data

(63) Continuation of application No. PCT/JP2018/007640, filed on Feb. 28, 2018.

(30) Foreign Application Priority Data
Mar. 21, 2017 (JP) .................. 2017-055069

(51) Int. Cl.
*B60W 30/09* (2012.01)
*B60Q 1/14* (2006.01)
(Continued)

(52) U.S. Cl.
CPC .......... *B60W 30/09* (2013.01); *B60Q 1/1423* (2013.01); *B60Q 9/008* (2013.01); *B60T 7/22* (2013.01);
(Continued)

(58) Field of Classification Search
None
See application file for complete search history.

(56) References Cited

U.S. PATENT DOCUMENTS 5,865,265 A 2/1999 Matsumoto
10,515,553 B2 * 12/2019 Deragarden ......... G05D 1/0293
(Continued)

FOREIGN PATENT DOCUMENTS

CN 101239596 A 8/2008
CN 103373299 A 10/2013
(Continued)

*Primary Examiner* — Navid Z. Mehdizadeh
(74) *Attorney, Agent, or Firm* — Maschoff Brennan

(57) ABSTRACT

In a driving assistance apparatus, an object detecting unit detects an object that is present in a periphery of an own vehicle based on an image captured by an imaging apparatus provided in the own vehicle. An avoidance control unit performs collision avoidance control for avoiding a collision between the detected object and the own vehicle when a collision between the object and the own vehicle is likely. A light distribution control unit switches irradiated light of an irradiation apparatus provided in the own vehicle between high beam and low beam based on a predetermined switching condition. The light distribution control unit performs switching suppression control to suppress switching of the irradiated light from high beam to low beam while the avoidance control unit is performing collision avoidance control in a case where the irradiated light is set to high beam.

15 Claims, 5 Drawing Sheets

(51) Int. Cl.
*B60T 7/22* (2006.01)
*B60W 10/18* (2012.01)
*B60Q 9/00* (2006.01)
*B60W 10/30* (2006.01)

(52) U.S. Cl.
CPC ............ *B60W 10/18* (2013.01); *B60W 10/30* (2013.01); *B60W 2554/00* (2020.02); *B60W 2556/00* (2020.02); *B60W 2710/18* (2013.01); *B60W 2710/30* (2013.01)

(56) References Cited

U.S. PATENT DOCUMENTS

| | | | |
|---|---|---|---|
| 2008/0130302 A1* | 6/2008 | Watanabe | B60Q 1/085 362/466 |
| 2008/0192496 A1 | 8/2008 | Mochizuki et al. | |
| 2008/0225271 A1* | 9/2008 | Ohmura | B60Q 1/085 356/51 |
| 2013/0274999 A1* | 10/2013 | Bengtsson | B60Q 1/143 701/36 |
| 2014/0063824 A1* | 3/2014 | Guan | B60Q 9/008 362/464 |
| 2015/0003086 A1 | 1/2015 | Yamasaki | |
| 2015/0028742 A1* | 1/2015 | Imaeda | B60Q 1/143 315/82 |
| 2016/0368413 A1 | 12/2016 | Nishii et al. | |

FOREIGN PATENT DOCUMENTS

| | | |
|---|---|---|
| JP | H01-275233 A | 11/1989 |
| JP | 6-278556 A | 10/1994 |
| JP | H07-277115 A | 10/1995 |
| JP | 2005-047383 A | 2/2005 |
| JP | 2008-222160 A | 9/2008 |
| JP | 2009-255639 A | 11/2009 |
| JP | 2015-009566 A | 1/2015 |
| JP | 2015-009647 A | 1/2015 |

* cited by examiner

DRIVING ASSISTANCE APPARATUS AND DRIVING ASSISTANCE METHOD FOR VEHICLE

CROSS-REFERENCE TO RELATED APPLICATIONS

The present application is based on Japanese Patent Application No. 2017-055069, filed on Mar. 21, 2017, the description of which is incorporated herein by reference.

BACKGROUND

Technical Field

The present disclosure relates to a driving assistance apparatus and a driving assistance method for a vehicle.

Background Art

Conventionally, a pre-crash safety system has been developed as a safety system for avoiding a collision with an obstacle that is present in the periphery of a vehicle. In this system, when a likelihood of a collision between the vehicle and an obstacle detected by an onboard imaging apparatus is determined to be present, collision with the obstacle is avoided by a collision avoidance operation being performed. In the collision avoidance operation, a warning apparatus or automatic brakes are operated.

SUMMARY

The present disclosure presents a driving assistance apparatus for a vehicle that includes an irradiation apparatus that irradiates light toward an advancing direction of an own vehicle and an imaging apparatus that images a periphery of the own vehicle. The driving assistance apparatus detects an object that is present in the periphery of the own vehicle based on an image captured by the imaging apparatus. The driving assistance apparatus performs collision avoidance control for avoiding a collision between the detected object and the vehicle when a collision between the object and the vehicle is likely. The driving assistance apparatus witches irradiated light of the irradiation apparatus between high beam and low beam based on a predetermined switching condition. The driving assistance apparatus performs switching suppression control to suppress switching of the irradiated light from high beam to low beam while the avoidance control unit is performing collision avoidance control in a case where the irradiated light is set to high beam.

DESCRIPTION OF THE EMBODIMENTS

Figure 1:
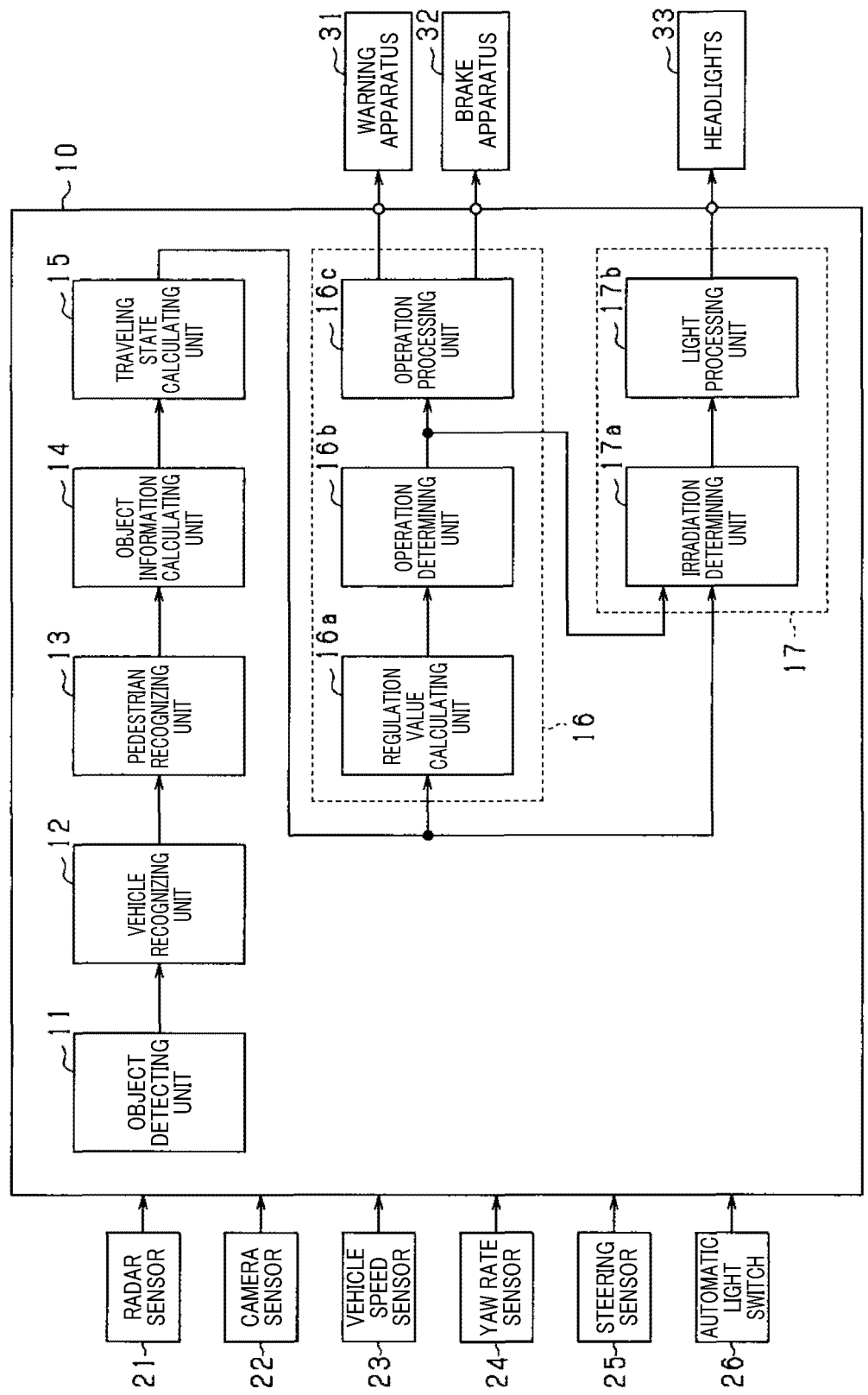
FIG. 1 is a block diagram of an overall configuration of a driving assistance apparatus.

Embodiments of the present disclosure relate to a driving assistance apparatus and a driving assistance method for a vehicle. In particular, the embodiments relate to a driving assistance technology for a vehicle for avoiding a collision between the vehicle and an object.

Conventionally, light distribution control in which onboard headlights are automatically switched between high beam and low beam is known (refer to, for example, JP-A-H01-275233). JP-A-H01-275233 discloses that, when a vehicle speed is equal to or less than a predetermined value that is prescribed in advance or when reflected light that is equal to or less than a predetermined value is received from a traveling environment, the headlights are automatically switched to low beam.

A range over which the imaging apparatus is able to detect an object differs depending on an irradiation state of the headlights. When the headlights are set to high beam, a detection distance is longer than that when the headlights are set to low beam. Therefore, when the irradiation state of an irradiation apparatus changes after a collision avoidance operation is started in accompaniment with the imaging apparatus detecting an object present in the periphery of an own vehicle, sight of a target object for collision avoidance control may be lost. In addition, as a result of sight of the target object being lost, collision avoidance control may no longer be appropriately performed.

It is thus desired to provide a driving assistance apparatus and a driving assistance method for a vehicle in which collision avoidance control for avoiding a collision between an own vehicle and an object can be appropriately performed.

An exemplary embodiment of the present disclosure is related to a driving assistance apparatus for a vehicle that includes an irradiation apparatus that irradiates light toward an advancing direction of an own vehicle and an imaging apparatus that images a periphery of the own vehicle. A first configuration includes: an object detecting unit that detects an object that is present in the periphery of the own vehicle based on an image captured by the imaging apparatus; an avoidance control unit that performs collision avoidance control for avoiding a collision between the object detected by the object detecting unit and the vehicle when a collision between the object and the vehicle is likely; and a light distribution control unit that switches irradiated light of the irradiation apparatus between high beam and low beam based on a predetermined switching condition. The light distribution control unit performs switching suppression control to suppress switching of the irradiated light from high beam to low beam while the avoidance control unit is performing collision avoidance control in a case where the irradiated light is set to high beam.

As a result of the above-described configuration, when an object is detected by the imaging apparatus in a state in which the irradiated light is set to high beam, and collision avoidance control is being performed with the detected object as a target object, the irradiated light of the irradiation apparatus can be held, as much as possible, at the state upon detection of the object. Therefore, even after start of collision avoidance control, the object that is the target object of collision avoidance control can be continuously kept in a detectable state. As a result, the object that is the target object of collision avoidance can be continuously detected after the start of collision avoidance control, and furthermore, collision avoidance control can be appropriately performed.

An embodiment will hereinafter be described with reference to the drawings. Here, sections among the embodiments below that are identical or equivalent to each other are given the same reference numbers in the drawings. Descriptions of sections having the same reference numbers are applicable therebetween. A driving assistance apparatus according to the present embodiment functions as a pre-crash safety system that performs various types of control for avoiding a collision with an object by detecting an object that is present in the periphery of an own vehicle and performing driving assistance by operating an onboard safety apparatus.

In FIG. 1, a driving assistance apparatus 10 is a computer that includes a central processing unit (CPU), a read-only memory (ROM), a random access memory (RAM), an input/output (I/O), and the like. The CPU actualizes the foregoing functions by running a program that is installed in the ROM. The driving assistance apparatus 10 is connected to each of a radar sensor 21 and a camera sensor 22 that are object detection sensors that detect an object that is present in the periphery of the own vehicle. Detection information regarding the object is inputted from these sensors.

For example, the radar sensor 21 is a publicly known millimeter-wave radar in which a high-frequency signal in a millimeter-wave band serves a transmission wave. The radar sensor 21 is provided in a front end portion of the own vehicle. The radar sensor 21 scans an area that spreads over a predetermined range ahead of the vehicle using radar signals, every predetermined amount of time. In addition, the radar sensor 21 receives electromagnetic waves reflected from a surface of an object that is outside the vehicle, and thereby acquires a distance to the object, a relative speed relative to the object, and the like as radar target object information. The radar target object information acquired by the radar sensor 21 is inputted to the driving assistance apparatus 10.

For example, the camera sensor 22 that serves as an imaging apparatus is a charge-coupled device (CCD) camera, a complementary metal-oxide-semiconductor (CMOS) image sensor, or a near-infrared camera. The camera sensor 22 is attached at a predetermined height in a vehicle-width-direction center at the front of the vehicle. The camera sensor 22 images, from a bird's-eye-view perspective, an area that spreads ahead of the vehicle over a predetermined angular range in the periphery of the own vehicle. An image (also referred to, hereafter, as a "captured image") captured by the camera sensor 22 is inputted to the driving assistance apparatus 10.

In addition, the own vehicle is also provided with various sensors, such as a vehicle speed sensor 23, a yaw rate sensor 24, and a steering sensor 25, as vehicle sensors that detect a traveling state of the own vehicle. The vehicle speed sensor 23 detects a vehicle speed. The yaw rate sensor 24 detects an angular velocity (yaw rate) in a turning direction of the vehicle. The steering sensor 25 detects a steering angle of a handle (steering wheel). Furthermore, the own vehicle is provided with headlights 33 and an automatic light switch 26. The headlights 33 are an irradiation apparatus that irradiates light toward an advancing direction of the own vehicle. The automatic light switch 26 is provided to enable a driver to set whether to automatically or manually operate an illumination state of the headlights 33. The headlights 33 can be switched between low beam and high beam through adjustment of an angle in a vehicle-height direction of an optical axis of irradiated light. Various detection signals of the vehicle sensors and operating signals of the switches are inputted to the driving assistance apparatus 10.

As shown in FIG. 1, the driving assistance apparatus 10 includes an object detecting unit 11, a vehicle recognizing unit 12, a pedestrian recognizing unit 13, an object information calculating unit 14, a traveling state calculating unit 15, an avoidance control unit 16, and a light distribution control unit 17.

The radar target object information is inputted to the object detecting unit 11 from the radar sensor 21. In addition, as a result of a captured image being inputted from the camera sensor 22 and image processing being performed, the object detecting unit 11 acquires a distance to an object that is present ahead of the own vehicle, a shape of the object, and the like as image target object information. Here, image target object information acquired through image processing in the camera sensor 22 may be inputted to the object detecting unit 11.

The vehicle recognizing unit 12 and the pedestrian recognizing unit 13 determine a type (such as another vehicle, a pedestrian, a bicycle, or an on-road obstacle) of the object that is present in the captured image of the camera sensor 22 by performing known image processing, such as template matching, on the captured image. Here, the vehicle recognizing unit 12 and the pedestrian recognizing unit 13 function as a type determining unit.

The object information calculating unit 14 determines whether a radar target object and an image target object are a same object, using the radar target object information and the image target object information. The radar target object is a target object that is detected by the radar sensor 21. The image target object that is a target object that is detected by the camera sensor 22. In addition, when determined that the radar target object and the image target object are the same object, the object information calculating unit 14 performs fusion of the radar target object information and the image target object information, and generates a fusion target object. Furthermore, the object information calculating unit 14 calculates a position and a speed of the fusion target object. The traveling state calculating unit 15 calculates a traveling state (such as an own vehicle speed or a yaw rate) based on the detection signals of the various sensors, such as the vehicle speed sensor 23, the yaw rate sensor 24, and the steering sensor 25.

The avoidance control unit 16 performs collision avoidance control for avoiding a collision between the object detected by the object detecting unit 11 and the own vehicle. The avoidance control unit 16 includes a regulation value calculating unit 16a, an operation determining unit 16b, and an operation processing unit 16c.

The regulation value calculating unit 16a calculates a collision avoidance time (time-to-collision [TTC]) between the target object detected by the object detecting unit 11 and the own vehicle, and a lateral position threshold that prescribes a width in a lateral direction in an operation area of a safety apparatus for collision avoidance. The collision avoidance time is an evaluation value that indicates a number of seconds until collision with the object when the own vehicle continues to travel at the own vehicle speed. For example, the collision avoidance time is calculated by a method such as a distance between the target object and the own vehicle being divided by a relative speed of the target object relative to the own vehicle. The collision avoidance time is set to a smaller value as the own vehicle speed increases.

The lateral position threshold is a threshold that indicates a lateral position range over which collision of the object with the own vehicle is predicted. For example, the lateral position threshold is calculated based on the relative speed of the target object in the lateral direction relative to the own vehicle. The collision avoidance time and the lateral position threshold calculated by the regulation value calculating unit 16a are inputted to the operation determining unit 16b.

The operation determining unit 16b determines whether to operate the safety apparatus using the collision avoidance time and the lateral position threshold. The operation determining unit 16b according to the present embodiment compares the collision avoidance time and an operation timing of the safety apparatus. When the collision avoidance time is equal to or less than the operation timing, and the lateral position of the fusion target object is within the operation area of the safety apparatus, the operation determining unit 16b outputs a command signal to the operation processing unit 16c. The command signal indicates that the safety apparatus is to be operated. The operation timing is set in advance to a value that differs for each operation for collision avoidance by the safety apparatus and is stored in the memory.

According to the present embodiment, a warning apparatus 31 and a brake apparatus 32 are provided as safety apparatuses. For example, the warning apparatus 31 is a speaker or a display that is set inside a vehicle cabin of the own vehicle. The brake apparatus 32 is a brake apparatus that applies braking force to the own vehicle. According to the present embodiment, as the collision avoidance operation, a warning operation in which the warning apparatus 31 is operated, a brake assist operation in which, when a brake operation by the driver is performed, braking force generated by the brake operation is intensified, and an automatic brake operation in which the brake apparatus 32 of the vehicle is automatically operated are performed.

Specifically, first, when the collision avoidance time is equal to or less than a first threshold, the operation determining unit 16b outputs a command signal that commands operation of the warning apparatus 31. When the collision avoidance time is equal to or less than a second threshold that is less than the first threshold, the operation determining unit 16b outputs a command signal that commands operation of brake assist. When the collision avoidance time subsequently becomes equal to or less than a third threshold that is less than the second threshold, and the likelihood of a collision between the object and the own vehicle further increases, the operation determining unit 16b outputs a command signal that commands operation of automatic brakes. The safety apparatus is operated at an earlier timing as the relative speed of the own vehicle relative to the object increases.

The operation processing unit 16c operates the warning apparatus 31 and the brake apparatus 32 based on determination results of the operation determining unit 16b. Here, as the safety apparatus, a seatbelt apparatus that draws in a seatbelt that is provided for each seat of the own vehicle, a steering apparatus that performs automatic steering, and the like may be provided.

The light distribution control unit 17 automatically controls the irradiation state of the headlights 33 when the automatic light switch 26 is set to "automatic". According to the present embodiment, the light distribution control unit 17 actualizes an automatic high-beam function in which an optical axis angle in a vehicle-height direction of the headlights 33 is automatically switched between high beam and low beam. The light distribution control unit 17 includes an irradiation determining unit 17a and a light processing unit 17b.

The irradiation determining unit 17a determines whether a predetermined switching condition for switching the optical axis in the vehicle-height direction of the headlights 33 between high beam and low beam is met. As the switching condition, according to the present embodiment, conditions (1) to (3), below, are included. When any of the conditions (1) to (3), below, is met, the irradiation determining unit 17a performs an automatic switching process in which the optical axis of the headlights 33 is switched between high beam and low beam.

(Switching Conditions)

(1) The optical axis is switched to low beam when the own vehicle speed detected by the vehicle speed sensor 23 is equal to or less than a determination value Vth.

(2) The optical axis is switched to low beam when the presence of another vehicle (referred to, hereafter, as a "leading vehicle") that is traveling in a traveling lane of the own vehicle ahead of the own vehicle is detected from the captured image of the camera sensor 22.

(3) The optical axis is switched to low beam when the presence of another vehicle (referred to, hereafter, as an "oncoming vehicle") that is traveling in an oncoming traffic lane of the own vehicle ahead of the own vehicle is detected from the captured image of the camera sensor 22.

In a low vehicle-speed region in which the own vehicle speed is equal to or less than the determination value Vth, recognition accuracy regarding an oncoming vehicle based on a captured image decreases. In light of this point, in the present system, the condition that "the optical axis is switched to low beam when the own vehicle speed is equal to or less than the determination value Vth" is included as the switching condition. The determination value Vth is a lower limit value of the vehicle speed at which detection accuracy of the camera sensor 22 regarding an oncoming vehicle can be sufficiently ensured. A signal indicating the determination result of the irradiation determining unit 17a is inputted to the light distribution control unit 17b.

The light processing unit 17b switches the optical axis in the vehicle-height direction between high beam and low beam by driving an actuator (not shown) of the headlights 33 based on the determination result of the irradiation determining unit 17a. Here, during vehicle traveling, as a result of the headlights 33 being set to high beam as a general rule, the driver is able to recognize faraway objects at night or the like at an early stage, and another vehicle or a pedestrian that is far from the own vehicle is able to notice the presence of the own vehicle at an early stage. Therefore, the light processing unit 17b maintains the high-beam state when neither a leading vehicle nor an oncoming vehicle is present ahead of the own vehicle and the own vehicle speed is higher than the determination value Vth.

Here, the object detection range of the camera sensor 22 differs depending on the optical axis height of the headlights 33. At high beam, irradiation can be performed to a farther distance than that at low beam. As a result, during high beam, the camera sensor 22 is able to detect an object that is present at a farther distance. Therefore, after an object is detected by the camera sensor 22 in a state in which the headlights 33 are set to high beam and the collision avoidance operation is started with the detected object as a target object, when the front headlights 33 are switched from high beam to low beam, sight of the target object for collision avoidance control may be lost. In this case, driving assistance control or ensuring safety of the vehicle may no longer be appropriately performed.

Figure 2A:
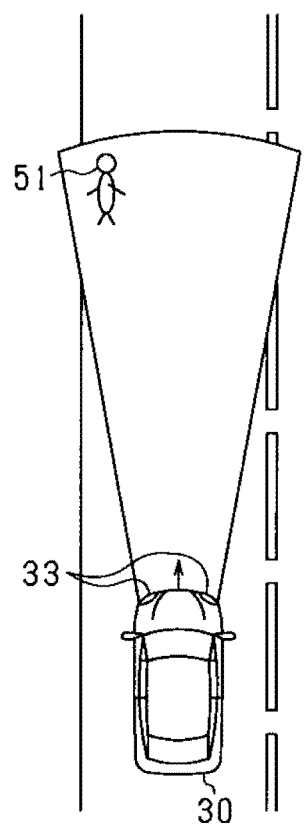
FIG. 2A is a diagram of state in which automatic brakes are operated at high beam.
Figure 2B:
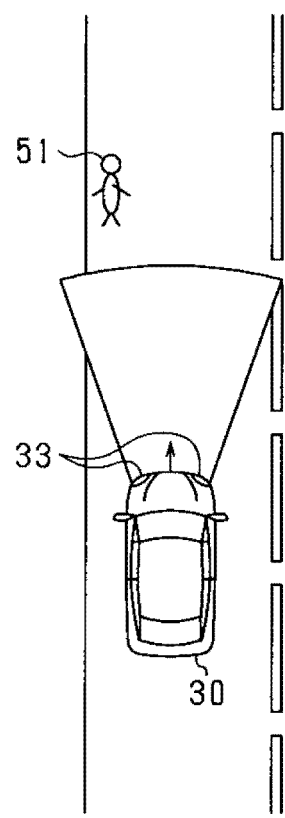
FIG. 2B is a diagram of a state in which the automatic brakes are operated at low beam.

FIGS. 2A and 2B show scenes in which a pedestrian 51 is present ahead of an own vehicle 30 that is traveling on a road at dusk, night, dawn, or the like, in time series. FIG. 2A shows a case in which the own vehicle 30 is traveling at a higher vehicle speed than the determination value Vth. FIG. 2B shows a case in which automatic brakes are operated in the traveling state shown in FIG. 2A and the own vehicle speed becomes a lower vehicle speed than the determination value Vth. In FIGS. 2A and 2B, the automatic light switch 26 of the own vehicle 30 is set to "automatic".

In cases in which neither a leading vehicle nor an oncoming vehicle is present ahead of the own vehicle 30, when the own vehicle speed is higher than the determination value Vth, as shown in FIG. 2A, the own vehicle 30 travels in a state in which the headlights 33 are set to high beam. In this case, as a result of the headlights 33 illuminating over a far distance ahead of the own vehicle 30 (such as 100 m ahead), an object detection distance of the camera sensor 22 increases. As a result, even the pedestrian 51 that is relatively far from the own vehicle 30 is detected by the camera sensor 22. In addition, when a likelihood of a collision between the own vehicle 30 and the pedestrian 51 is present, first, the warning apparatus 31 is operated and, subsequently, brake assist and automatic brakes are sequentially operated as the collision avoidance operation regarding the pedestrian 51 detected by the camera sensor 22.

Should control in which the automatic high-beam function is prioritized be performed when automatic brakes are operated to avoid a collision with the pedestrian 51, and the own vehicle speed becomes equal to or less than the determination value Vth, as shown in FIG. 2B, the headlights 33 are switched from high beam to low beam. In this case, an irradiation distance of the headlights 33 decreases. Therefore, the detection distance of the camera sensor 22 decreases, and an object (pedestrian 51) that has been detected by the camera sensor 22 up to this point may no longer be detected by the camera sensor 22. In addition, as a result of the target object for collision avoidance control being lost, automatic brakes may be canceled.

Here, according to the present embodiment, when an object is detected by the camera sensor 22 in a state in which the headlights 33 are set to high beam and the collision avoidance operation is started based on the object detection, switching suppression control in which switching of the headlights 33 from high beam to low beam is suppressed is performed regardless of whether the switching condition is met. According to the present embodiment, as switching suppression control, switching of the headlights 33 is prohibited during a period in which the own vehicle is performing the collision avoidance operation. As a result, the target object of the collision avoidance becoming lost as a result of switching of the headlights 33 does not occur, and the operation for collision avoidance regarding the own vehicle and the object is not canceled midway through the operation.

Figure 3:
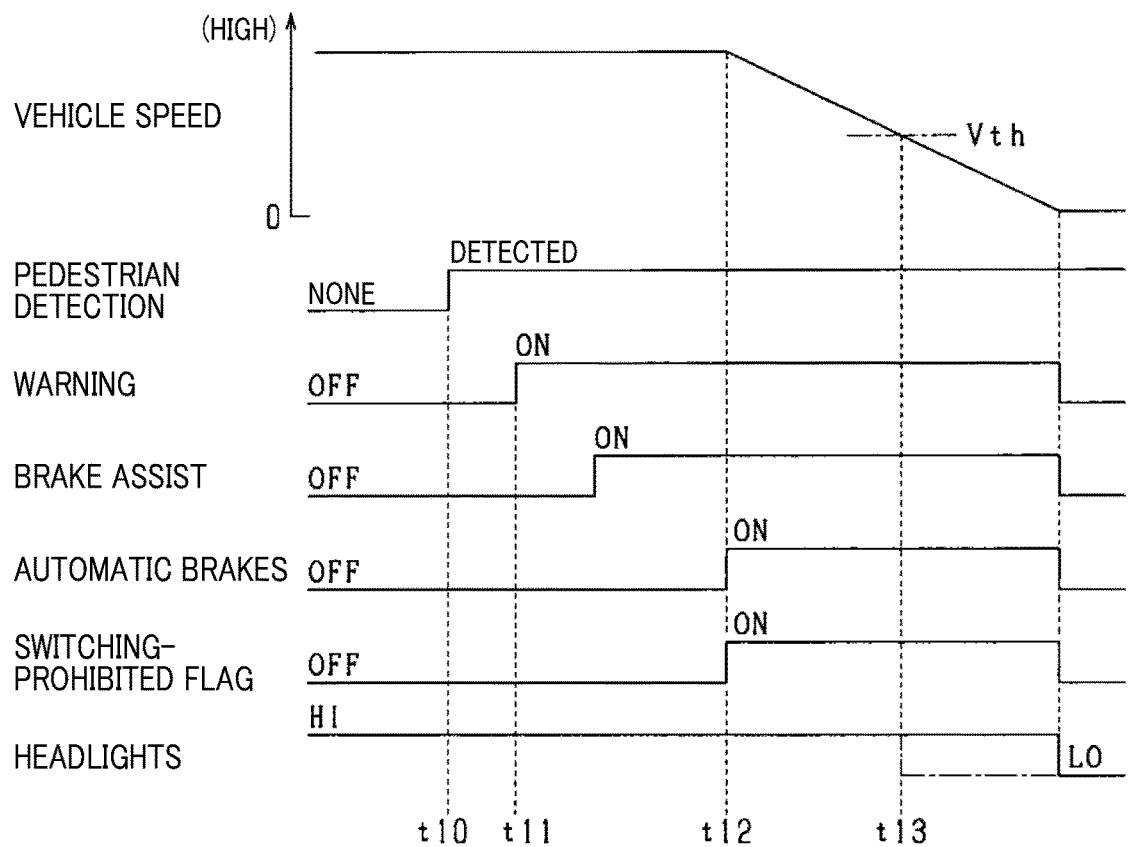
FIG. 3 is a timing chart of a specific aspect of an automatic switching process.

A specific aspect of the automatic switching process according to the present embodiment will be described with reference to a timing chart in FIG. 3. In FIG. 3, a case in which neither a leading vehicle nor an oncoming vehicle is present ahead of the own vehicle, and the presence of a pedestrian ahead of the own vehicle is detected by at least the camera sensor 22 during traveling at high beam (the case shown in FIG. 2A) is assumed.

FIG. 3 shows transitions of: the own vehicle speed; pedestrian detection by the camera sensor 22; the operation of the warning apparatus 31; the operation of brake assist; the operation of automatic brakes; a switching-prohibited flag; and high beam/low beam of the headlights 33. The switching-prohibited flag is a flag that indicates that switching from high beam to low beam is prohibited. The switching-prohibited flag is set to off when switching from high beam to low beam is permitted, and set to on when switching from high beam to low beam is prohibited.

In FIG. 3, during traveling at high beam, the pedestrian 51 is detected ahead of the own vehicle 30 by the camera sensor 22 (time t10). Subsequently, at time t11 when the collision avoidance time becomes equal to or less than the first threshold, the warning apparatus 31 is operated. Then, when the collision avoidance time becomes equal to or less than the second threshold, brake assist is operated. At time t12 at which the collision avoidance time becomes equal to or less than the third threshold, automatic brakes are operated. At time t12 that is the operation timing of the automatic brakes, the switching-prohibited flag is switched from off to on.

When the vehicle speed of the own vehicle 30 decreases in accompaniment with the operation of the automatic brakes, and the vehicle speed becomes equal to or less than the determination value Vth at subsequent time t13, because the switching-prohibited flag is set to on, switching of the headlights 33 to low beam is not performed. At time t13 and subsequent thereto, the headlights 33 are held at high beam (see solid line shown in FIG. 3). Unlike control in the present disclosure, when the collision avoidance operation is not taken into consideration in the automatic high-beam function, as indicated by a single-dotted chain line in FIG. 3, at time t13 at which the vehicle speed becomes equal to less than the determination value Vth, that is, while automatic brakes are being operated, the headlights 33 are switched from high beam to low beam.

The headlights 33 are held at high beam at time t13 and subsequent thereto. Subsequently, when the own vehicle 30 stops before the pedestrian 51 and collision with the pedestrian 51 is avoided, operation of the safety apparatus for collision avoidance control is stopped and transition to normal control is made. In addition, the switching-prohibited flag is switched to off. As a result, the headlights 33 are switched from high beam to low beam. Here, even after the own vehicle 30 is stopped, the switching-prohibited flag may remain set to on and high beam may be maintained.

Figure 4:
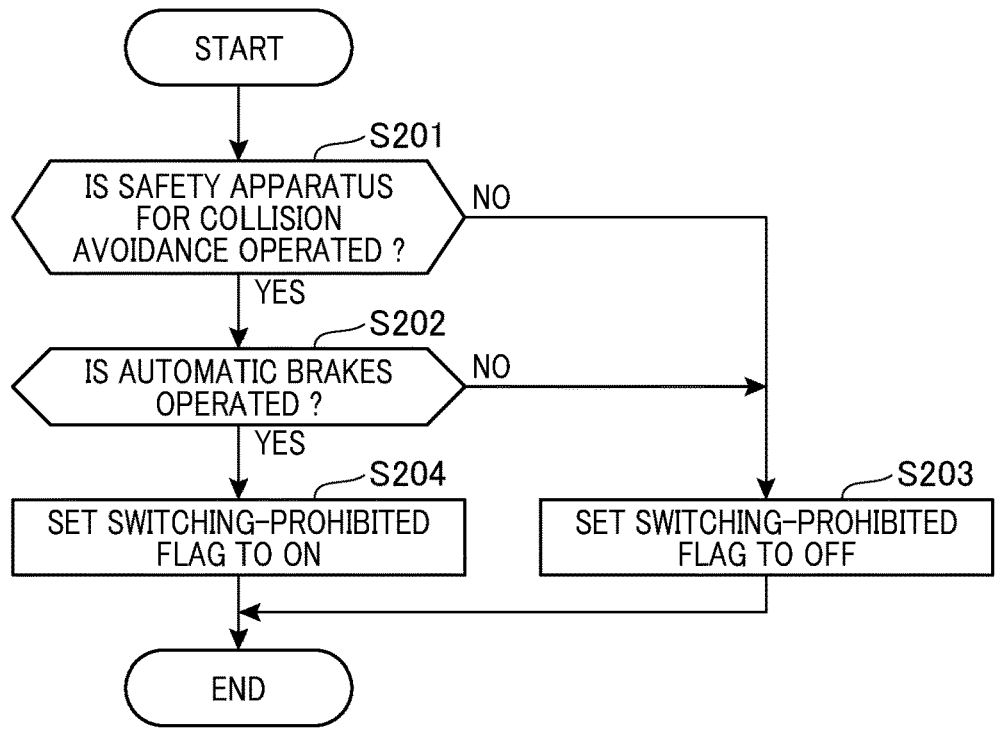
FIG. 4 is a flowchart of the processing steps in a switching-prohibited flag setting process.
Figure 5:
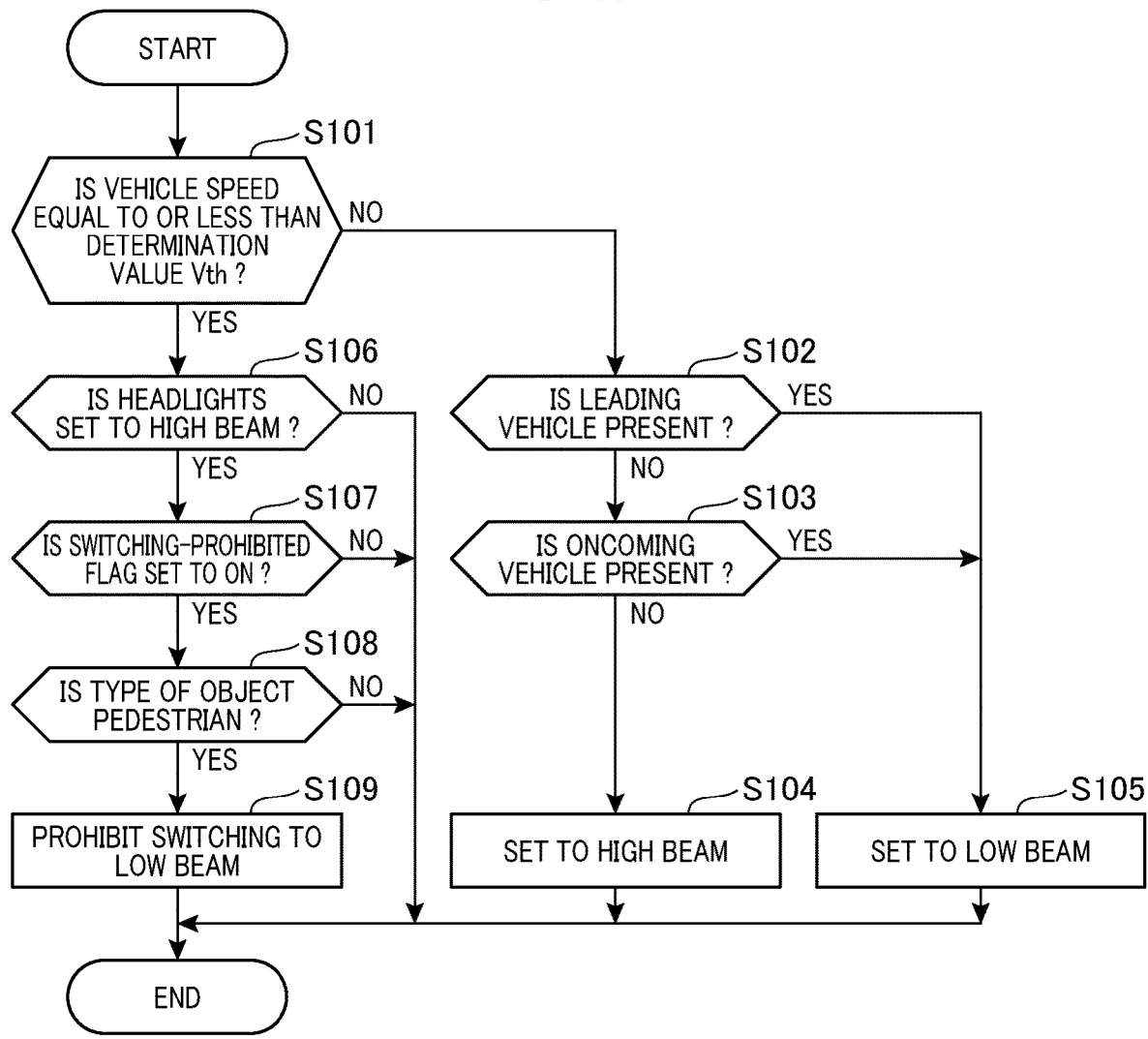
FIG. 5 is a flowchart of the processing steps in the automatic switching process.

Next, cooperative control between collision avoidance control according to the present embodiment and the automatic high-beam function will be described with reference to flowcharts in FIG. 4 and FIG. 5. A switching-prohibited flag setting process in FIG. 4 and the automatic switching process in FIG. 5 are performed at a predetermined cycle by the driving assistance apparatus 10 when the automatic light switch 26 is set to "automatic".

First, the processing steps of the switching-prohibited flag setting process will be described with reference to FIG. 4. In FIG. 4, at step S201, the driving assistance apparatus 10 determines whether the safety apparatus is operated to avoid a collision with an object detected by the camera senor 22. When determined that a current time is after the start of operation of the safety apparatus, the driving assistance apparatus 10 proceeds to step S202 and determines whether automatic brakes are operated. When the current time is before the operation of automatic brakes, the driving assistance apparatus 10 proceeds to step S203 and sets the switching-prohibited flat to off. Meanwhile, when the current time is at the operation timing of automatic brakes or subsequent thereto, the driving assistance apparatus 10 proceeds to step S204 and sets the switching-prohibited flag to on.

Next, the processing steps of the automatic switching process according to the present embodiment will be described with reference to FIG. 5. In FIG. 5, at step S101, the driving assistance apparatus 10 determines whether the vehicle speed detected by the vehicle speed sensor 23 is equal to or less than the determination value Vth. When determined that the vehicle speed is higher than the determination value Vth, the driving assistance apparatus 10 determines NO at step S101 and proceeds to step S102. At step S102, the driving assistance apparatus 10 determines whether a leading vehicle is present ahead of the own vehicle. Here, when the leading vehicle is detected by the camera sensor 22 and the radar sensor 21, the driving assistance apparatus 10 determines YES.

At subsequent step S103, the driving assistance apparatus 10 determines whether an oncoming vehicle is present ahead of the own vehicle. Here, when determined that the oncoming vehicle is detected by the camera sensor 22 and the radar sensor 21, the driving assistance apparatus 10 determines YES. When determines that neither a leading vehicle nor an oncoming vehicle is present ahead of the own vehicle, the driving assistance apparatus 10 proceeds to step S104 and sets the headlights 33 to high beam. Meanwhile, when determined that at least either of a leading vehicle and an oncoming vehicle is present ahead of the own vehicle, the driving assistance apparatus 10 proceeds to step S105 and sets the headlights 33 to low beam.

When determined that the vehicle speed detected by the vehicle speed sensor 23 is equal to or less than the determination value Vth, the driving assistance apparatus 10 determines YES at step S101, proceeds to step S106, and determines whether the headlights 33 are set to high beam. When determined that the headlights 33 are set to high beam, the driving assistance apparatus 10 determines YES at step S106, proceeds to step S107, and determines whether the switching-prohibited flag is set to on. When determined that the switching-prohibited flag is set to off, the driving assistance apparatus 10 immediately ends this iteration of the present routine. When determined that the switching-prohibited flag is set to on, the driving assistance apparatus 10 proceeds to step S108.

At step S108, the driving assistance apparatus 10 determines whether the type of the object detected by the camera sensor 22, that is, the object to be a target object of the operation of automatic brakes is a pedestrian. When determined that the target object of the automatic brakes is a pedestrian, the driving assistance apparatus 10 proceeds to step S109 and prohibits switching from high beam to low beam. As a result, at the operation timing of the automatic brakes and subsequent thereto, the vehicle-height direction of the optical axis of the headlights 33 is held in the high-beam state even when the vehicle speed becomes equal to or less than the determination value Vth.

Meanwhile, when determined that the object type that is the target object of the operation of automatic brakes is not a pedestrian, the driving assistance apparatus 10 ends the present routine without prohibiting switching of the headlights 33 to low beam. In this case, the headlights 33 are switched from high beam to low beam. Here, in a case where the headlights 33 are held at high beam at step S104, the headlights 33 are switched to low beam when the own vehicle safely passes by the pedestrian and when the own vehicle speed is equal to or less than the determination value Vth.

According to the present embodiment described in detail above, the following excellent effects are achieved.

When the camera sensor 22 detects an object in a state in which the headlights 33 are set to high beam and the collision avoidance operation is performed with the detected object as a target object, the configuration is such that, after the start of the collision avoidance operation, switching from high beam to low beam is suppressed regardless of whether the condition for switching from high beam to low beam is met. As a result of this configuration, a state in which the object to be the operation target object of collision avoidance control is detectable can be continuously maintained even after the start of the collision avoidance operation. As a result, the likelihood of the operation target object of collision avoidance control becoming lost can be reduced. Consequently, collision avoidance control can be appropriately performed.

In cases in which the own vehicle speed falls below the determination value Vth as a result of the operation of automatic brakes, should switching from high beam to low beam be prioritized, the risk of sight of the operation target object of collision avoidance control being lost midway through the operation increases. In this regard, according to the present embodiment, when the collision avoidance operation is performed in a state in which the headlights 33 are set to high beam, switching from high beam to low beam is prohibited at the operation timing of the safety apparatus and subsequent thereto. As a result, a pre-crash safety system and an automatic high-beam system can appropriately and cooperatively function in terms of ensuring safety.

The configuration is such that whether switching of the headlights 33 to low beam is prohibited is determined based on the type of the object determined by the vehicle recognizing unit 12 and the pedestrian recognizing unit 13. In a state in which a peripheral environment during vehicle travel is dark, such as at dusk, night, dawn, or the like, the pedestrian 51 is difficult to detect by the camera sensor 22. Therefore, the necessity of maintaining a state in which the operation target object of collision avoidance control can be detected is high even after the start of the collision avoidance operation. Meanwhile, lamps and reflectors are attached to bicycles, motorcycles, and the like. Therefore, detectability of bicycles, motorcycles, and the like by the camera sensor 22 is not as low as that of the pedestrian 51. Consequently, even when switching to low beam is prioritized, an issue in which collision avoidance control cannot be appropriately performed does not easily occur.

In light of the foregoing points, according to the present embodiment, when the target object for collision avoidance control is the pedestrian 51, switching from high beam to low beam is prohibited at the start timing of the collision avoidance operation and subsequent thereto. When the target object for collision avoidance control is another vehicle, a bicycle, or a motorcycle, switching from high beam to low beam is permitted at the start timing of the collision avoidance operation and subsequent thereto. As a result, whether priority is given to holding high beam for collision avoidance regarding an object or switching to low beam in a state in which the presence of an oncoming vehicle is likely can be selected based on each circumstance.

The configuration is such that switching from high beam to low beam is prohibited at the operation timing of automatic brakes and subsequent thereto. When the own vehicle speed is equal to or less than the determination value Vth, in cases in which an oncoming vehicle is actually present, recognition that an oncoming vehicle is not present may be made as a result of decrease in the detection accuracy of the camera sensor 22. Therefore, the period over which switching from high beam to low beam is prohibited is preferably kept to a minimum. In this regard, as a result of the above-described configuration in which a period after the automatic brakes are actually operated is set as a switching-prohibited period regarding switching from high beam to low beam, switching to low beam can be prohibited during a period in which vehicle-speed decrease is occurring with certainty as a result of the collision avoidance operation.

Other Embodiments

The present disclosure is not limited to the above-described embodiment and may, for example, be carried out in the following manner.

Instead of the configuration in which switching from high beam to low beam is suppressed at the operation timing of automatic brakes and subsequent thereto, the configuration may be such that switching from high beam to low beam is suppressed at the operation timing of the warning apparatus 31 and subsequent thereto. Specifically, when the warning apparatus 31 is operated at time t11 in FIG. 3, the switching-prohibited flag is switched from off to on at this time t11. Then, during a period from time t11, switching from high beam to low beam is prohibited regardless of the own vehicle speed. As a result of such control, switching to low beam can be prohibited at an earlier stage during the period in which the own vehicle speed is likely to becomes equal to or less than the determination value Vth. Consequently, switching from high beam to low beam being performed at the start timing of the collision avoidance operation and subsequent thereto can be prevented with further certainty.

Alternatively, the configuration may be such that switching from high beam to low beam is suppressed at the operation timing of the brake assist function and subsequent thereto. In addition, the configuration may be such that, in a driving assistance system in which a first brake in which the brake apparatus 32 is operated and weak deceleration at a first deceleration is performed, and a second brake in which strong deceleration at a second deceleration that is greater than the first deceleration is performed after operation of the first brake are performed as automatic brake operations, switching from high beam to low beam is suppressed at the operation timing of the first brake or the second brake and subsequent thereto.

There is a system that provides a function for automatically variably setting an irradiation distance of the headlights 33 such that a leading vehicle is irradiated, as light distribution control. In this system, when the leading vehicle is detected by the camera sensor 22, the irradiation distance of the headlights 33 is automatically set such that the headlights 33 irradiate to the detection position of the leading vehicle. In addition, when a leading vehicle is not detected by the camera sensor 22, a maximum distance over which the headlight 33 is able to irradiate is automatically set as the irradiation distance. Here, the maximum distance differs depending on high beam and low beam. In a system such as this, switching from high beam to low beam may be suppressed at the start timing of the collision avoidance operation and subsequent thereto. In addition, the irradiation distance at the start timing of the collision avoidance operation may be held. As a result, the object that is the target object for collision avoidance control can be kept in a detectable state even after the collision avoidance operation is started.

Figure 6:
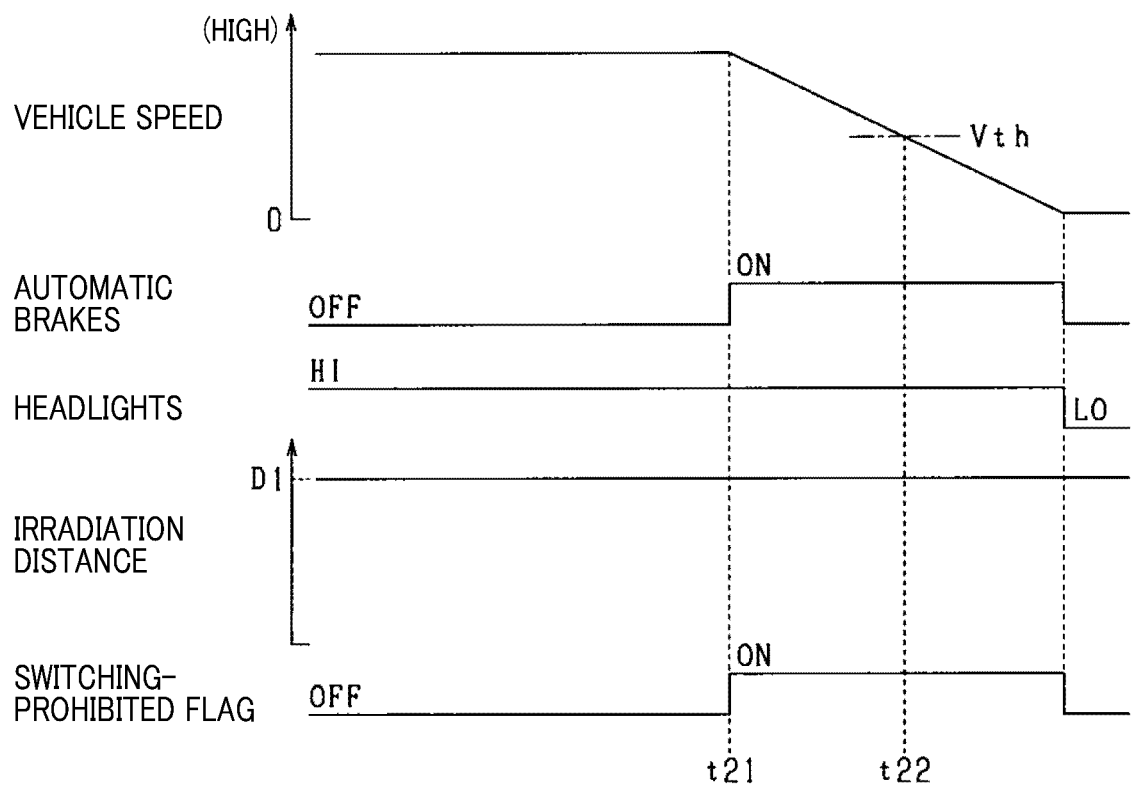
FIG. 6 is a timing chart of an example according to another embodiment.

Specifically, in FIG. 6, during traveling at high beam, the pedestrian 51 is detected ahead of the own vehicle 30 by the camera sensor 22. Subsequently, when the automatic brakes are operated, the switching-prohibited flag is switched from off to on at time t21 that is the operation timing of automatic brakes. In addition, at time t21 and subsequent thereto, the irradiation distance of the headlights 33 is held at an irradiation distance D1 at the operation timing of automatic brakes. When the vehicle speed of the own vehicle 30 decreases in accompaniment with the operation of automatic brakes, and the vehicle speed becomes equal to or less than the determination value Vth at subsequent time t22, switching of the headlights 33 to low beam is not performed and high beam is held.

Here, in FIG. 6, the irradiation distance D at the operation timing of automatic brakes is held. However, the configuration may be such that the irradiation distance at the operation timing of the warning apparatus 31 is held. For example, regarding the irradiation distance of the headlights 33, the irradiation distance at the operation timing of the warning apparatus 31 is held. The switching-prohibited flag is switched from off to on at the operation timing of automatic brakes.

There is a system that provides a function for automatically switching an irradiation direction of the headlights 33 to a direction in which the object detected by the camera sensor 22 is present. In such a system, when the collision avoidance operation is performed when the headlights 33 are set to high beam, the irradiation direction of the headlights 33 may be held in the irradiation direction at the start of the collision avoidance operation. As a result, the target object for collision avoidance control can be kept in a detectable state even after the collision avoidance operation is started.

Figure 7:
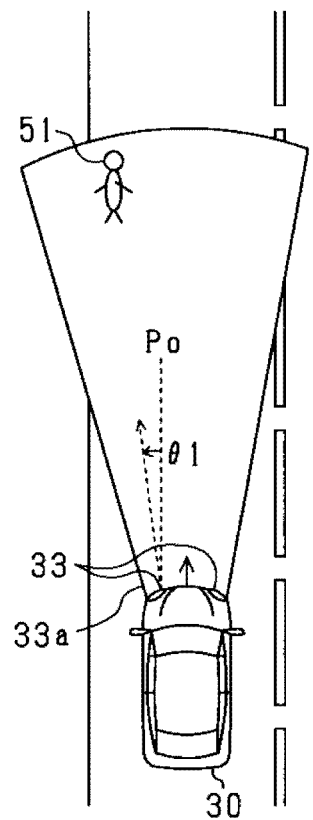
FIG. 7 is a diagram of an example according to another embodiment.

A specific aspect of when the irradiation direction of the headlights 33 is automatically switched is shown in FIG. 7. According to the present embodiment, only in cases in which the type of the object detected by the camera 22 is a pedestrian is the headlight 33 irradiated towards the object. In FIG. 7, when the pedestrian 51 is detected ahead of the own vehicle 30 by the camera sensor 22, the irradiation direction of the headlights 33 is automatically switched to a direction in which the pedestrian 51 is present. In FIG. 7, the pedestrian 51 is on a left side relative to the advancing direction of the own vehicle 30. Therefore, of left and right headlights 33, regarding a left headlight 33a, the irradiation direction is tilted towards a leftward direction by θ1 from a reference direction Po. Then, in a case where the collision avoidance operation is started when the headlights 33 are set to high beam, switching from high beam to low beam is prohibited at the start timing of the collision avoidance operation and subsequent thereto. In addition, the irradiation direction of the headlights 33 is held at the irradiation direction at the start timing of the collision avoidance operation, that is, an orientation that is tilted towards the leftward direction by θ1 from the reference direction Po.

According to the above-described embodiment, the configuration is such that switching from high beam to low beam is suppressed at the start timing of the collision avoidance operation and subsequent thereto under a condition that the type of the object detected by the camera sensor 22 is the pedestrian 51. However, switching from high beam to low beam may be suppressed at the start timing of the collision avoidance operation and subsequent thereto regardless of the type of object. Alternatively, the configuration may be such that switching from high beam to low beam is suppressed at the start timing of the collision avoidance operation and subsequent thereto under a condition that the type of the object detected by the camera sensor 22 is either of the pedestrian 51 and a bicycle. Furthermore, animals (such as dogs and cats) may be included in addition to the pedestrian 51.

Conditions other than the above-described conditions (1) to (3) may be included as the switching conditions for switching between high beam and low beam. For example, a light receiving sensor that detects reflected light may be attached to the own vehicle 30. A condition in which high beam is switched to low beam when the reflected light detected by the light receiving sensor is greater than a predetermined intensity may be included. A reason for this is that, in climatic environments such as snow and fog, the reflection of light becomes intense when high beam is set, and visibility is thought to deteriorate instead.

When automatic switching from high beam to low beam in a case where the reflected light is greater than a predetermined intensity is included in the switching conditions, the high-beam state may be held without switching from high beam to low beam even when the reflected light is greater than the predetermined intensity, at the start timing of the collision avoidance operation and subsequent thereto.

As switching suppression control, instead of a configuration in which switching from high beam to low beam is prohibited during the period in which the collision avoidance operation is being operated, a configuration in which the timing for switching from high beam to low beam is delayed may be used. Specifically, when an object is detected by the camera sensor 22 in a state in which the headlights 33 are set to high beam and the collision avoidance operation is started based on the object detection, during the period in which the collision avoidance operation is being operated, the timing for switching the headlights 33 from high beam to low beam is set to be later than a timing at which the switching condition is met. For example, in FIG. 3, while the collision avoidance operation is being operated, high beam is not switched to low beam until a timing TA (such as a timing immediately before vehicle stop) that is later than time t13 that is the timing at which the switching condition is met. At timing TA, the headlights 33 are switched from high beam to low beam.

According to the above-described embodiment, the driving assistance system for a vehicle that includes the camera sensor 22 and the radar sensor 21 as the object detection sensors is described. However, a driving assistance system for a vehicle that does not include the radar sensor 21 is also applicable.

The above-described constituent elements are conceptual and are not limited to the above-described embodiment. For example, a function provided by a single constituent element may be actualized by being dispersed among a plurality of constituent elements. Functions provided by a plurality of constituent elements may be actualized by a single constituent element.

While the present disclosure has been described with reference to embodiments thereof, it is to be understood that the disclosure is not limited to the embodiments and constructions. The present disclosure is intended to cover various modification examples and modifications within the range of equivalency. In addition, various combinations and configurations, and further, other combinations and configurations including more, less, or only a single element thereof are also within the spirit and scope of the present disclosure.

What is claimed is:

1. A driving assistance apparatus for a vehicle that includes an irradiation apparatus that irradiates light toward an advancing direction of an own vehicle and an imaging apparatus that images a periphery of the own vehicle, the driving assistance apparatus comprising:
a processor programmed to:
detect an object that is present in the periphery of the own vehicle based on an image captured by the imaging apparatus;
perform collision avoidance control including an automatic brake operation in which a brake apparatus of the vehicle is automatically operated, the collision avoidance control configured to avoid a collision between the object detected and the vehicle when a collision between the object and the vehicle is likely;
determine whether to switch irradiated light of the irradiation apparatus between high beam and low beam based on a predetermined switching condition, the predetermined switching condition including switching of the irradiated light from high beam to low beam in response to an own vehicle speed being equal to or less than a determination value; and
perform switching suppression control to suppress switching of the irradiated light from high beam to low beam, despite the own vehicle speed being equal to or less than the determination value, in response to determining that the automatic brake operation is being performed, wherein the switching suppression control maintains the irradiated light in a state of high beam.

2. The driving assistance apparatus according to claim 1, wherein:
the processor is configured to:
determine a type of the object, and
determine whether to suppress switching of the irradiated light from high beam to low beam by switching suppression control, based on the type of the object determined by the processor.

3. The driving assistance apparatus according to claim 2, wherein:
an irradiation distance of the irradiation apparatus is variable; and
the processor is configured to hold the irradiation distance of the irradiation apparatus at an irradiation distance at start of operation of collision avoidance control for a state in which the processor is performing collision avoidance control in a case where the irradiated light is set to high beam.

4. The driving assistance apparatus according to claim 2, wherein:
an irradiation direction of the irradiation apparatus is variable; and
the processor is configured to hold the irradiation direction of the irradiation apparatus at an irradiation direction at start of operation of collision avoidance control for a state in which the processor is performing collision avoidance control in a case where the irradiated light is set to high beam.

5. The driving assistance apparatus according to claim 1, wherein:
an irradiation distance of the irradiation apparatus is variable; and
the processor is configured to hold the irradiation distance of the irradiation apparatus at an irradiation distance at start of operation of collision avoidance control for a state in which the processor is performing collision avoidance control in a case where the irradiated light is set to high beam.

6. The driving assistance apparatus according to claim 1, wherein:

an irradiation direction of the irradiation apparatus is variable; and the processor is configured to hold the irradiation direction of the irradiation apparatus at an irradiation direction at start of operation of collision avoidance control for a state in which the processor is performing collision avoidance control in a case where the irradiated light is set to high beam.

7. The driving assistance apparatus according to claim 1, wherein:

the processor is configured to perform switching suppression control to suppress switching of the irradiated light from high beam to low beam in response to the processor determining that:

a safety apparatus for performing collision avoidance control is being operated; and automatic brakes of the vehicle are being operated.

8. A driving assistance apparatus for a vehicle that includes an irradiation apparatus that irradiates light toward an advancing direction of an own vehicle and an imaging apparatus that images a periphery of the own vehicle, the driving assistance apparatus comprising:

a processor programmed to:

detect an object that is present in the periphery of the own vehicle based on an image captured by the imaging apparatus;

perform collision avoidance control including at least one of a warning operation in which a warning apparatus is operated and an automatic brake operation in which a brake apparatus of the vehicle is automatically operated when the likelihood of a collision between the object and the vehicle further increases after start of the warning operation;

determine whether to switch irradiated light of the irradiation apparatus between high beam and low beam based on a predetermined switching condition, the predetermined switching condition including switching of the irradiated light from high beam to low beam in response to an own vehicle speed being equal to or less than a determination value; and perform switching suppression control to suppress switching of the irradiated light from high beam to low beam, despite the own vehicle speed being equal to or less than the determination value, in response to determining that the warning operation is being performed, wherein the switching suppression control maintains the irradiated light in a state of high beam.

9. The driving assistance apparatus according to claim 8 wherein:

an irradiation distance of the irradiation apparatus is variable; and the processor is configured to hold the irradiation distance of the irradiation apparatus at an irradiation distance at start of operation of collision avoidance control for a state in which the processor is performing collision avoidance control in a case where the irradiated light is set to high beam.

10. The driving assistance apparatus according to claim 8 wherein:

an irradiation direction of the irradiation apparatus is variable; and the processor is configured to hold the irradiation direction of the irradiation apparatus at an irradiation direction at start of operation of collision avoidance control for a state in which the processor is performing collision avoidance control in a case where the irradiated light is set to high beam.

11. The driving assistance apparatus according to claim 8, wherein:

the processor is configured to perform switching suppression control to suppress switching of the irradiated light from high beam to low beam in response to the processor determining that:

a safety apparatus for performing collision avoidance control is being operated; and automatic brakes of the vehicle are being operated.

12. The driving assistance apparatus according to claim 8, wherein:

the processor is configured to determine a type of the object, and determine whether to suppress switching of the irradiated light from high beam to low beam by switching suppression control, based on the type of the object determined by the processor.

13. The driving assistance apparatus according to claim 12, wherein:

an irradiation distance of the irradiation apparatus is variable; and the processor is configured to hold the irradiation distance of the irradiation apparatus at an irradiation distance at start of operation of collision avoidance control for a state in which the processor is performing collision avoidance control in a case where the irradiated light is set to high beam.

14. The driving assistance apparatus according to claim 12, wherein:

an irradiation direction of the irradiation apparatus is variable; and the processor is configured to hold the irradiation direction of the irradiation apparatus at an irradiation direction at start of operation of collision avoidance control for a state in which the processor is performing collision avoidance control in a case where the irradiated light is set to high beam.

15. A driving assistance method for a vehicle that includes an irradiation apparatus that irradiates light toward an advancing direction of an own vehicle and an imaging apparatus that images a periphery of the own vehicle, the driving assistance method comprising:

detecting an object that is present in the periphery of the own vehicle based on an image captured by the imaging apparatus;

performing collision avoidance control including an automatic brake operation in which a brake apparatus of the vehicle is automatically operated, the collision avoidance control configured to avoid a collision between the detected object and the vehicle when a collision between the object and the vehicle is likely;

determining whether to switch irradiated light of the irradiation apparatus between high beam and low beam based on a predetermined switching condition, the predetermined switching condition including switching of the irradiated light from high beam to low beam in response to an own vehicle speed being equal to or less than a determination value; and performing switching suppression control to suppress switching of the irradiated light from high beam to low beam, despite the own vehicle speed being equal to or less than the determination value, in response to determining that the automatic brake operation is being performed, wherein the switching suppression control maintains the irradiated light in a state of high beam.

* * * * *